United States Patent
Tanaka et al.

(10) Patent No.: US 7,899,337 B1
(45) Date of Patent: Mar. 1, 2011

(54) OPTICAL TRANSCEIVER WITH GRADUAL STOP OR START FUNCTION

(75) Inventors: Hiromi Tanaka, Yokohama (JP); Hiroto Ishibashi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1023 days.

(21) Appl. No.: 11/711,130

(22) Filed: Feb. 27, 2007

(30) Foreign Application Priority Data

Feb. 28, 2006 (JP) ............... 2006-053054

(51) Int. Cl.
 *H04B 10/04* (2006.01)
 *H04B 10/08* (2006.01)
 *H04J 14/00* (2006.01)

(52) U.S. Cl. ............ 398/197; 398/15; 398/25; 398/33; 398/94

(58) Field of Classification Search ............ 398/9, 398/15, 22, 25, 33, 135–138, 197, 94
See application file for complete search history.

(56) References Cited

U.S. PATENT DOCUMENTS 6,850,709 B1 * 2/2005 Gfeller et al. ............... 398/118
7,620,317 B2 * 11/2009 Stewart et al. ............... 398/22
2002/0126716 A1 * 9/2002 Vreeland ............... 372/31
2002/0149821 A1 10/2002 Aronson et al.

FOREIGN PATENT DOCUMENTS

| JP | 8-195733 | 7/1996 |
| JP | 10-145337 | 5/1998 |
| JP | 2004-134576 | 4/2004 |
| JP | 2005-260325 | 9/2005 |

* cited by examiner

*Primary Examiner*—Dalzid Singh
(74) *Attorney, Agent, or Firm*—Smith, Gambrell & Russell, LLP

(57) ABSTRACT

The present invention provides an optical transmitter applicable to the WDM communication system. The optical transmitter includes a light-emitting device, an APC circuit and a processing unit. The processing unit, responding to a command TX_DISABL, which is sent from the control unit that communicates with the host controller, stops the optical output power of the transmitter by decreasing the reference to a preset value in step wise. Moreover, the processing unit, responding to a command ENABLE that is also sent from the control unit, starts the optical output by increasing the reference to another preset value in step wise.

6 Claims, 9 Drawing Sheets

OPTICAL TRANSCEIVER WITH GRADUAL STOP OR START FUNCTION

BACKGROUND OF THE INVENTION

1. Field of the Invention

The present invention relates to an optical transceiver applied in an optical communication.

2. Related Prior Art

The United States Patent application published as US 2002/0149821A has disclosed an optical transceiver with the SFP (Small Form factor Pluggable) configuration, where the transceiver terminates or starts the operation for outputting an optical signal in response to a state, the high level or the low level, of the TX_DISABLE signal sent from the host controller. A multi source agreement provided from the SFF committee has disclosed the specification of the SFP transceiver.

When an optical transceiver is applied in the WDM (Wavelength Division Multiplexing) system, a plurality of optical signals each transmitted from individual optical transceiver is multiplexed by an optical multiplexer to transmit on an optical transmission line. Thus multiplexed signal is amplified by optical amplifiers arranged on the transmission line. The optical amplifier, which includes an optical excitation source, adjusts the power of the excitation source, by monitoring the power of the input and output of the optical signals, so as to keep the optical gain thereof.

Each transceiver in the WDM system outputs the optical signal, which is directly or indirectly modulated by the electrical signal input therein. This state, namely, a state outputting a modulated optical signal, is called as the ON state. On the other hand, the optical transceiver is sometimes compelled to stop the modulation independent of the input electrical signal by a command sent from the host system, or to keep the optical output power constant at a preset level smaller than the low level in the ON state, which is called as the OFF state. The transition from the ON state to the OFF state is often called as the DISABLE of the optical output, while, the transition from the OFF state to the ON state is sometimes called as the ENABLE of the optical output.

In the WDM system, the input level of the optical amplifier depends on the states of the optical transceivers that send optical signals in the optical transmission line. As explained, the optical amplifier operates to keep the optical gain thereof constant; the time constant to keep the optical gain is slower than the time constant to change the state of the optical transceiver, namely, a time from the ON state to the OFF state or from the OFF state to the ON state. Accordingly, the gain of the optical amplifier becomes excessive or insufficient during the transition period of the optical gain, which disarranges the optical level of each optical signal. In the WDM system with a long reach, the optical signal transmitted in the optical transmission line is amplified by a plurality of the optical amplifiers until the signal reaches the end station, which accumulates the variation of the optical levels of each signal.

SUMMARY OF THE INVENTION

One aspect of the present invention relates to an optical transceiver that solves above subject appeared in the WDM system. The optical transceiver according to the present invention that communicates with a host controller comprises a semiconductor laser diode, an auto-power-controller circuit and a control unit. The laser diode outputs an optical signal. The auto-power-control circuit adjusts output power of the optical signal to a target value. The control unit that provides a reference table to store a plurality of references is configured to receive a command from the host controller, and to sequentially set, synchronizing with the command, one of references read from the table, in the auto-power-control circuit as the target value. In the present invention, the output power of the optical signal from the laser diode gradually varies in step wise.

Another aspect of the present invention relates to a method for adjusting output power of an optical signal output from the optical transceiver. The process comprises steps of; (a) receiving a command from the host controller, where the command determines whether the optical transceiver is in an operating mode or a holding mode, (b) reading one of references stored in the reference table by the control unit, (c) setting one of the references that is read from the reference table into the auto-power-control circuit as the target value, (d) varying the output power of the optical signal output from the laser diode to the target value by the auto-power-control circuit, and (e) iterating steps from (b) to (d) until the output power of the optical signal becomes a predetermined value. According to the present method, the output power of the optical signal is gradually varied in step wise.

DESCRIPTION OF PREFERRED EMBODIMENTS

Next, preferred embodiments of the present invention will be described as referring to accompanying drawings. In the description, the same numerals or symbols will refer to the same elements without overlapping explanations.

Figure 1:
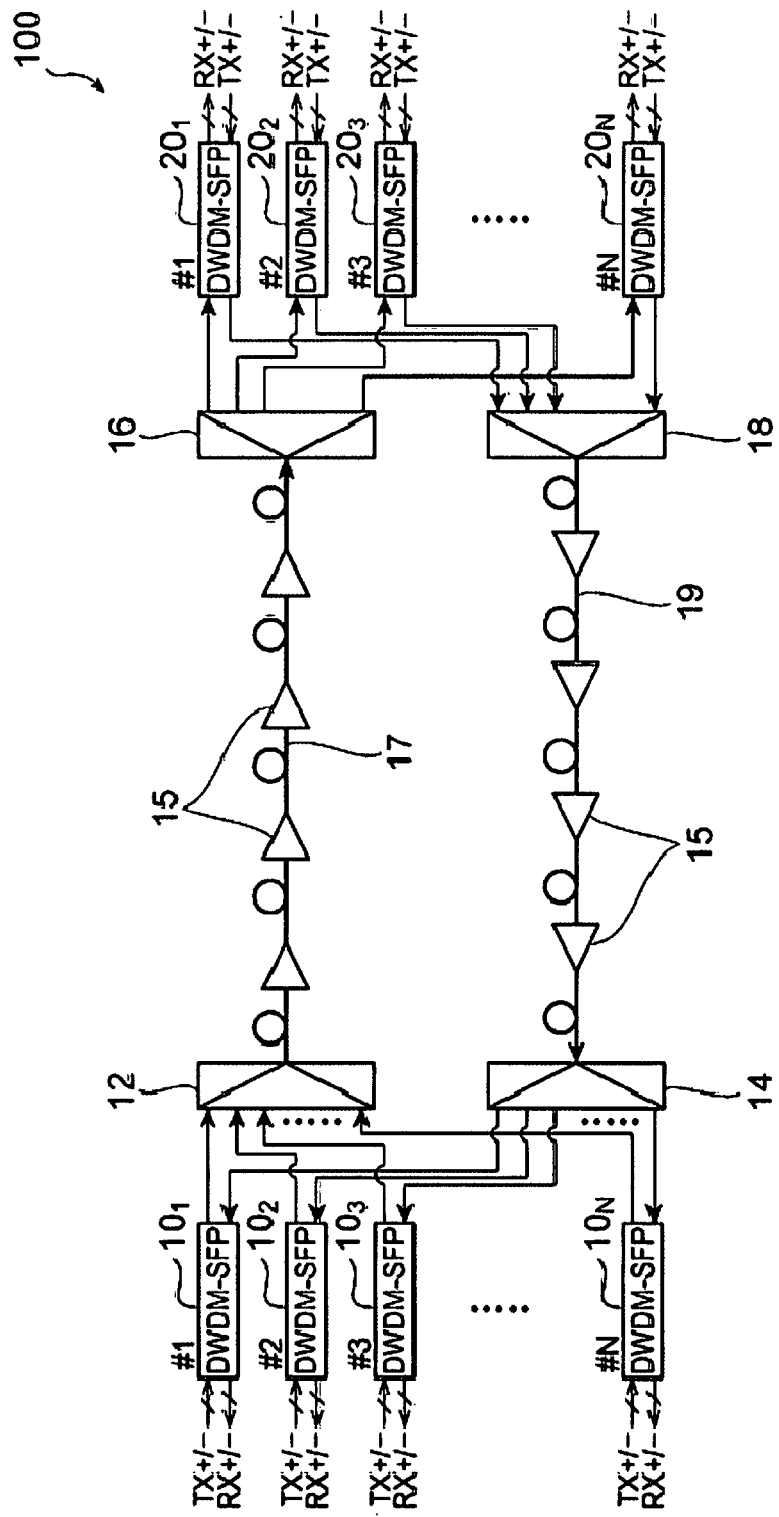
FIG. 1 is a schematic diagram showing the WDM system with the long reach configuration.

The embodiment explained below is related to an optical transceiver that operates as not only the optical transmitter but also the optical receiver. FIG. 1 is a schematic diagram showing the WDM system with the long reach that applies optical transceivers, 10 and 20, of the present embodiment. The WDM system 100 performs the full-duplex optical communication between transceivers, 10 and 20.

The WDM system 100 configures N-channels, where N is greater than two (2), and each channel is attributed with a wavelength selected from $\lambda_1$~$\lambda_N$ different from each other. Depending on the number of channels, the WDM system 100 provides N count of optical transceivers 10 in one station and also N count of optical transceivers 20 in another station. These transceivers, 10 and 20, may configure the same architecture, and will be referred by $10_1, 10_2, \ldots 10_N$ for the optical transceiver 10, while, by $20_1, 20_2, \ldots 20_N$ for the transceivers 20 in the counter station. One of the transceiver $10_m$ optically communicates with the counter transceiver $20_m$ by an optical signal with the wavelength $\lambda_m$, where m is an integer grater than or equal to 1 and smaller than or equal to N.

Figure 2:
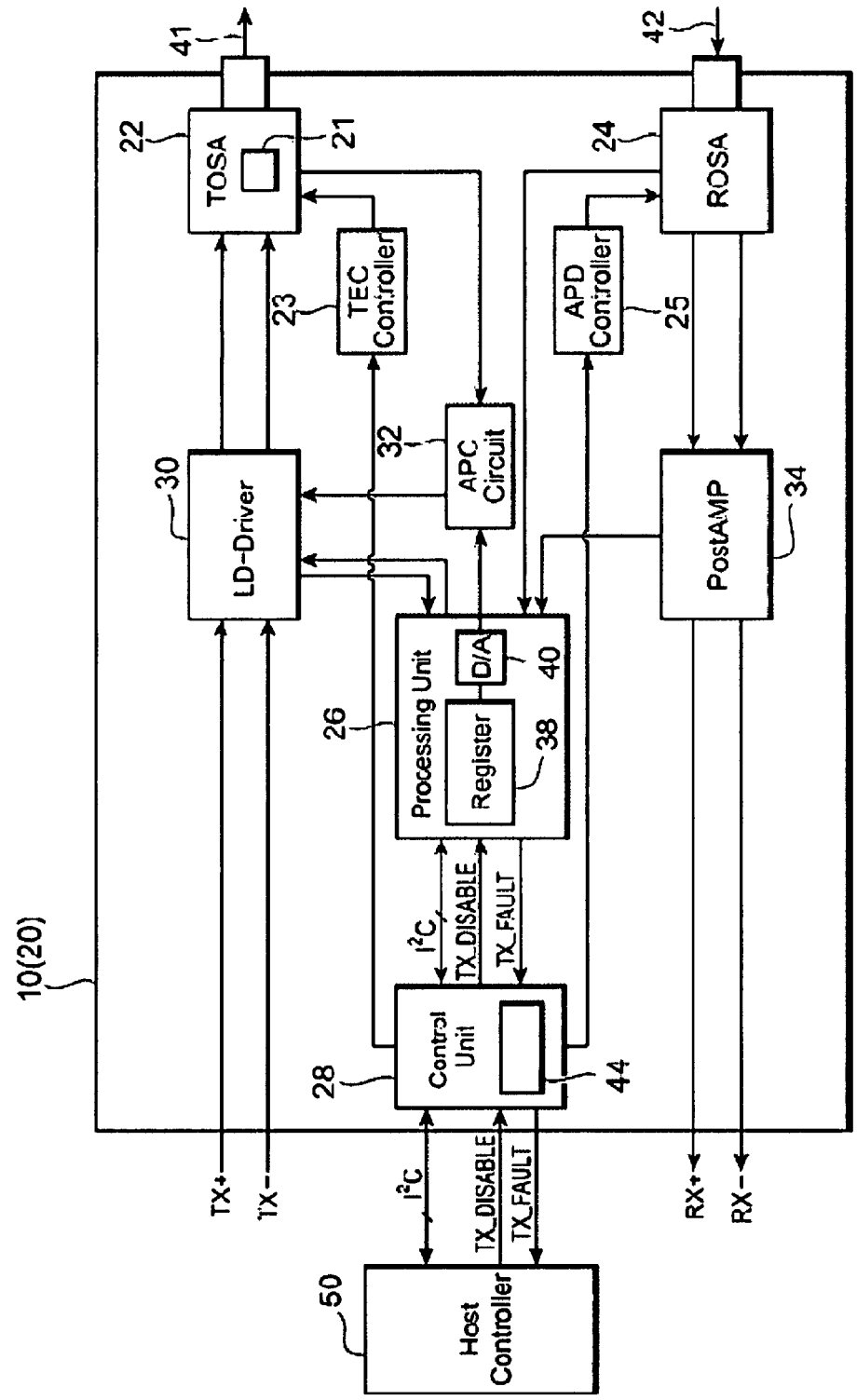
FIG. 2 is a block diagram of the optical transceiver according to the present invention.

FIG. 2 is a block diagram of the optical transceiver 10. Here, another optical transceiver 20 may configure the same architecture with that of the optical transceiver 10. Accordingly, explanations below may be applicable to the other optical transceiver 20 in the counter station.

The optical transceiver 10 is a type of the SFP (Small Form factor Pluggable) transceiver and may be applicable to the DWDM (Dense Wavelength Division Multiplexing) communication system. The transceiver 10 provides a transmitter optical subassembly (TOSA) 22 that transmits an optical signal 41, a receiver optical subassembly (ROSA) 24 that receives another optical signal 42, a processing unit 26 to control the operation of the TOSA 22 and ROSA 24, and a control unit 28 to control the processing unit 26.

The TOSA 22 installs a semiconductor laser diode (LD) 21 that emits the optical signal 41. The processing unit 26 integrates an LD driver 30 that sends an electrical driving signal corresponding to the optical signal 41 to the LD 21 to drive the LD. The processing unit 26 also includes an auto-power control (APC) circuit 32 to adjust a magnitude and an extinction ratio of the optical signal. That is, the APC circuit 32 keeps it constant for the average magnitude and the extinction ratio of the optical signal 41 output from the LD 21.

The LD 21 is mounted on a thermo-electric cooler (TEC) in the TOSA 22, which is not illustrated in FIG. 2. A TEC controller 23 controls a temperature of the LD 21 by adjusting the temperature of the TEC. The control unit 28 controls the TEC controller 23.

The ROSA 24 includes an avalanche photodiode (APD) to receive the optical signal 42. An APD controller 25 supplies a bias voltage whose level is controlled by the control unit 28 to the APD to convert the optical signal 42 into an electric signal with a preset conversion gain. The electrical signal converted by the APD is amplified by a pre-amplifier installed within the ROSA 24 and thus amplified electrical signal is sent to the post amplifier 34. The post amplifier 34 further amplifies the electrical signal and outputs the amplified signal to the outside of the optical transceiver 10.

The processing unit 26 intervenes between the controller unit 28 that is a digital circuit and analog circuits such as the LD driver 30, the APC circuit 32 and the post amplifier 34. The processing unit 26 installs a register 38 that temporally stores a target parameter to be set in the APC circuit 32 and a digital-to-analog converter to convert the preset parameter in a digital form into a corresponding analog signal so as to be used in the APC circuit 32. The control unit 28 can overwrite the target parameter in the register 38. The APC circuit 32 operates so as to set the output power of the optical signal 41 equal to the target parameter in the register 38.

The optical transceiver 10 is configured to couple with the host controller 50. The host controller 50, by communicating with the control unit 28 in the transceiver 10, monitors and controls the optical transceiver 10. A command TX_DISABLE, which is sent from the host controller 50 to the control unit 28, instructs the transceiver 10 to change the operation thereof from the operating mode to the hold mode, or from the hold mode to the operating mode.

When the optical transceiver 10 is in the operating mode, the LD 21 outputs the optical signal 41 which is directly or indirectly modulated by the electrical signal input to the LD driver 30. On the other hand, when the optical transceiver 10 is in the hold mode, the LD 21 stops to output the optical signal independent of the electrical signal by turning off the LD 21 or decreases the optical output therefrom to a level below the LOW level in the operating mode. In the explanation below, the transition from the operating mode to the hold mode will be called as the DISABLE, while the transition from the hold mode to the operating mode will be called as the ENABLE. When the command TX_DISABLE is asserted, which corresponds to the hold mode, the optical signal 41 from the LD 21 is stopped, while, the LD 21 outputs the optical signal 41 when the command TX_DISABLE is negated.

The control unit 28 passes the command TX_DISABLE sent from the host controller 50 to the processing unit 26. The processing unit 26, responding to the command TX_DISABLE, stops or starts the LD 21 to output optical signal 41.

Referring to FIG. 1 again, respective outputs of the TOSA 22 of transceivers, $10_1$ to $10_N$ in one station are merged by the optical multiplexer 12, while, the output of the de-multiplexer 14 is divided to respective ROSA 24 in transceivers, $10_1$ to $10_N$. The output of another de-multiplexer 16 is divided into respective ROSAs 24 in transceivers, $20_1$ to $20_N$, while, the output from the TOSAs 22 in transceivers, $20_1$ to $20_N$, are merged in the optical multiplexer 18. Between the optical multiplexer 12 and the optical de-multiplexer 16 are provided with the optical transmission line 17, while, between another pair of the multiplexer 14 and the de-multiplexer 18 are provided with another optical transmission line 19. The respective transmission lines, 17 and 18, interpose a plurality of optical amplifiers 15.

The optical multiplexer 12 multiplexes optical signals, $S_1$ to $S_N$, with wavelengths from $\lambda_1 \sim \lambda_N$, they are output from optical transceivers, $10_1$ to $10_N$ to generate one wavelength multiplexed optical signal. This WDM signal transmits on the optical transmission line 17 as amplified by optical amplifiers 15. The optical de-multiplexer 16, receiving the amplified WDM signal, divides respective optical signals, $S_1$ to $S_N$. The ROSA 24 in each optical transceiver 20 receives one of the de-multiplexed signals, $S_1$ to $S_N$.

Similarly, the optical multiplexer 18 multiplexes optical signals, $S_1$ to $S_N$, with wavelengths different from each other each output from the optical transceivers, $20_1$ to $20_N$, and the optical transmission line 19 carries this WDM signal as amplified by the plurality of optical amplifiers 15. The optical de-multiplexer 14, receiving this WDM signal, de-multiplexes it into a plurality of optical signals, $S_1$ to $S_N$ with wavelengths different from each other. Further, thus de-multiplexed optical signals, $S_1$ to $S_N$, are received by respective ROSAs of the optical transceivers, $10_1$ to $10_N$.

Figure 3:
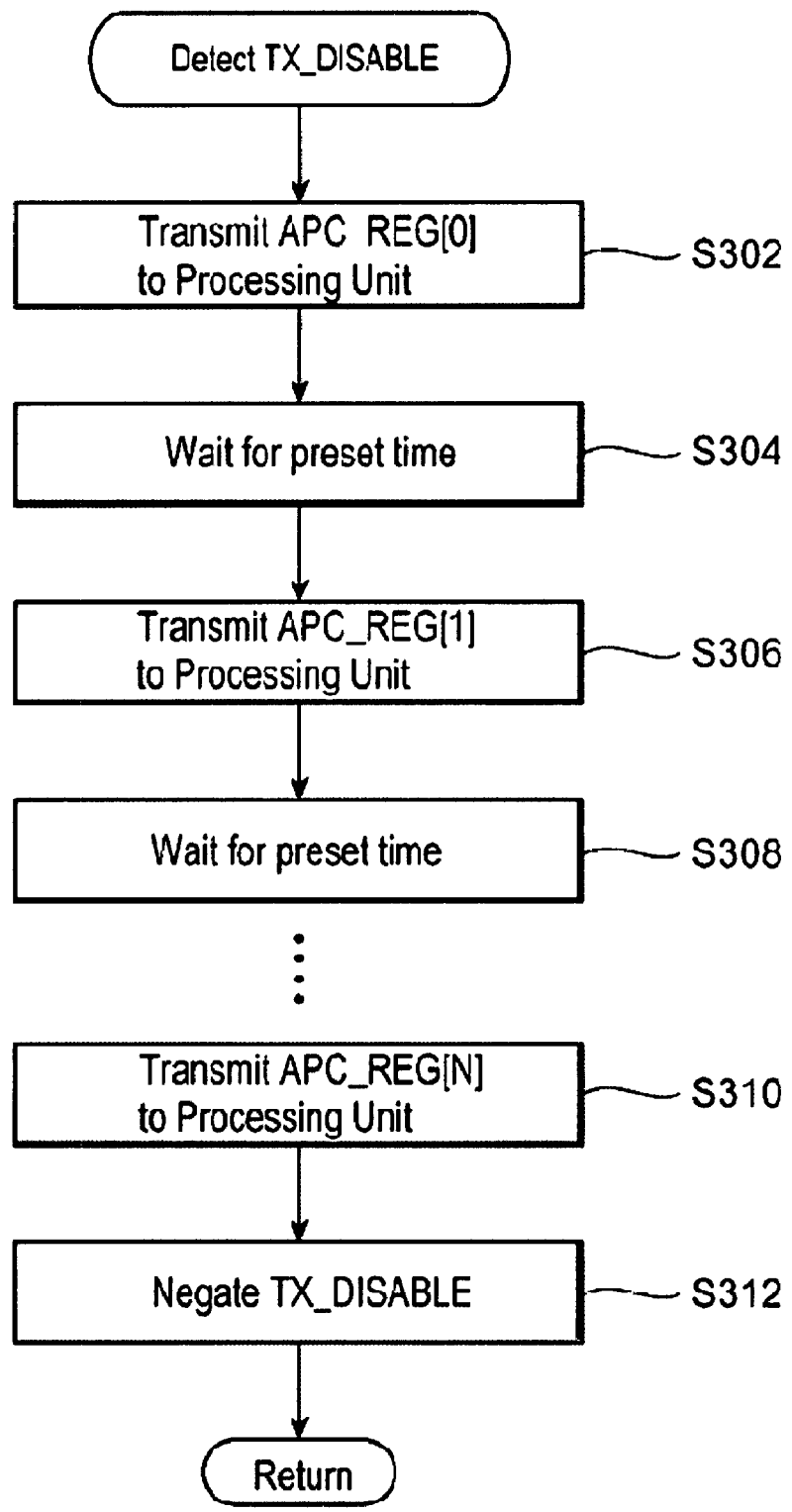
FIG. 3 is a flow chart executed at the DISABLE of the optical signal.

Next will explain a protocol of to stop the optical signal 41 in the optical transceivers, 10 and 20, which is called as the DISABLE operation. FIG. 3 is a flow chart showing the protocol of the DISABLE operation carried out by the control unit 28. The leading edge of the command TX_DISABLE from the LOW level, which corresponds to the operating mode, to the HIGH level, which corresponds to the hold mode, triggers the process shown in FIG. 3 as an interruption process for the primary process.

Figure 4:
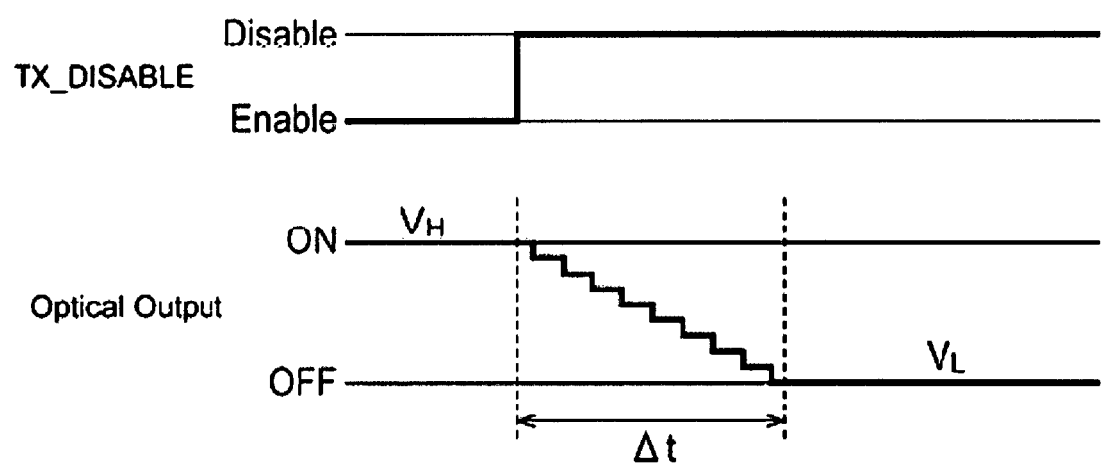
FIG. 4 is a time chart of the DISABLE operation of the optical transceiver.

FIG. 4 is a time chart showing the DISABLE operation of the optical signal. Synchronizing with the command TX_DISABLE that rises from the LOW level, which corresponds to the operating mode, to the HIGH level corresponding to the hold mode, the optical output power of the signal 41 gradually decreases in step wise from the target value $V_H$ in the operating mode to the minimum value $V_L$ in the hold mode.

Figure 5:
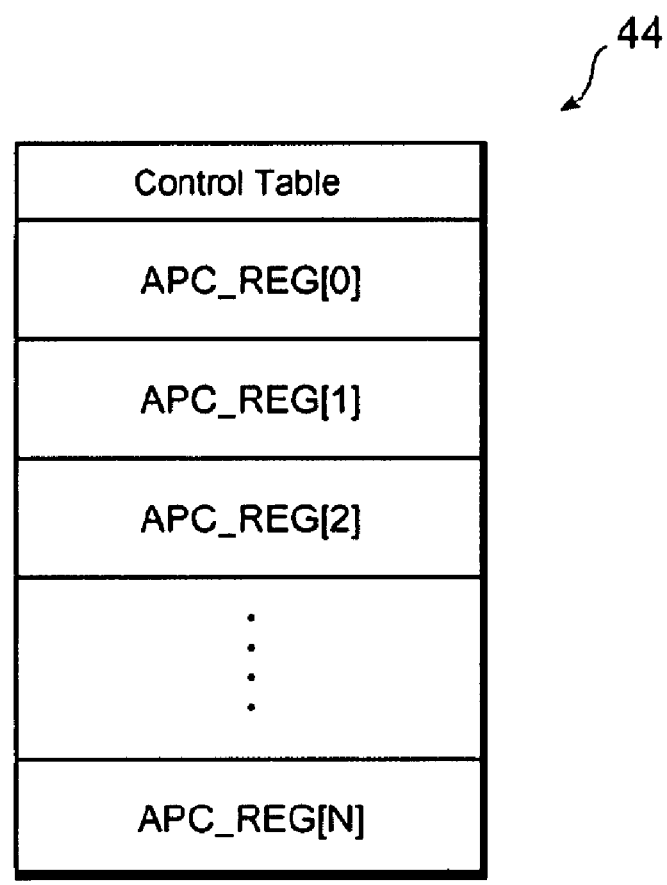
FIG. 5 is a schematic diagram showing a look-up table storing control parameters.

FIG. 5 schematically shows a reference table 44 referred by the control unit during the process shown in FIG. 3. The reference table 44 stores a series of preset references, APC_REG[0], APC_REG[1], . . . and APC_REG[N]. The reference APC_REG[0] corresponds to the target value $V_H$ of the optical output power in the operating mode, that is, while, the reference APC_REG[N] corresponds to the minimum value $V_L$, which is the value when the transceiver 10 is in the hold mode. Other references set the optical output power of the signal 41 to a value between the target value $V_H$ and the minimum value $V_L$. The larger the numeral in the parenthesis, the closer the optical output power corresponding to the minimum value $V_L$.

As shown in FIG. 3, the control unit 28 reads the preset reference APC_REG[0] from the reference table 44 and transfers this reference APC_REG[0] to the processing unit 26, at step S302. A serial interface, such as the I²C bus, may perform this transfer. The control unit 28 holds by a predetermined period after the transfer at step S304. During the holding period of the control unit 28, the processing unit 26 overwrites the register 38 with the received reference, and transmits this reference converted into an analog from by the digital-to-analog converter 40 to the APC circuit 32. Finally, the APC circuit 32 adjusts the optical output power of the signal 41 corresponding to the reference APC_REG[0].

Subsequently, the control unit 28 re-reads the reference APC_REG[1] from the reference table 44 and transfer thus read reference to the processing unit 26 at step s306. The control unit 28 holds itself again by the preset period at step S308. During the holding of the control unit 28, the processing unit 26 overwrites the register 38 by thus transferred reference APC_REG[1] to decrease the optical output power of the signal 41 to a value corresponding to the reference APC_REG[1].

Thus, preset references with smaller value are sequentially read from the reference table 44 with a constant period, and the register 38 is sequentially overwritten by thus read references. The control unit 28, after setting the final reference APC_REG[N] to the processing unit 26 at step S310, changes the command TX_DISABLE to be sent to the processing unit 26 from the operating mode to the hold mode at step S312. The processing unit 26, after setting the optical output power of the signal 41 to be the minimum value $V_L$ that corresponds to the reference APC_REG[N] and responding to the asserting of the command TX_DISABLE, stops to supply the driving current from the LD-Driver 30 to the LD 21.

Subsequently, the control unit 28 resumes the primary routine as enabling the interrupt of the command TX_DISABLE at step S314. Thus, by sequentially revising the register 38 with references stored in the reference table 44, the optical output power of the signal 41 may be gradually decreased in step wise.

Figure 6:
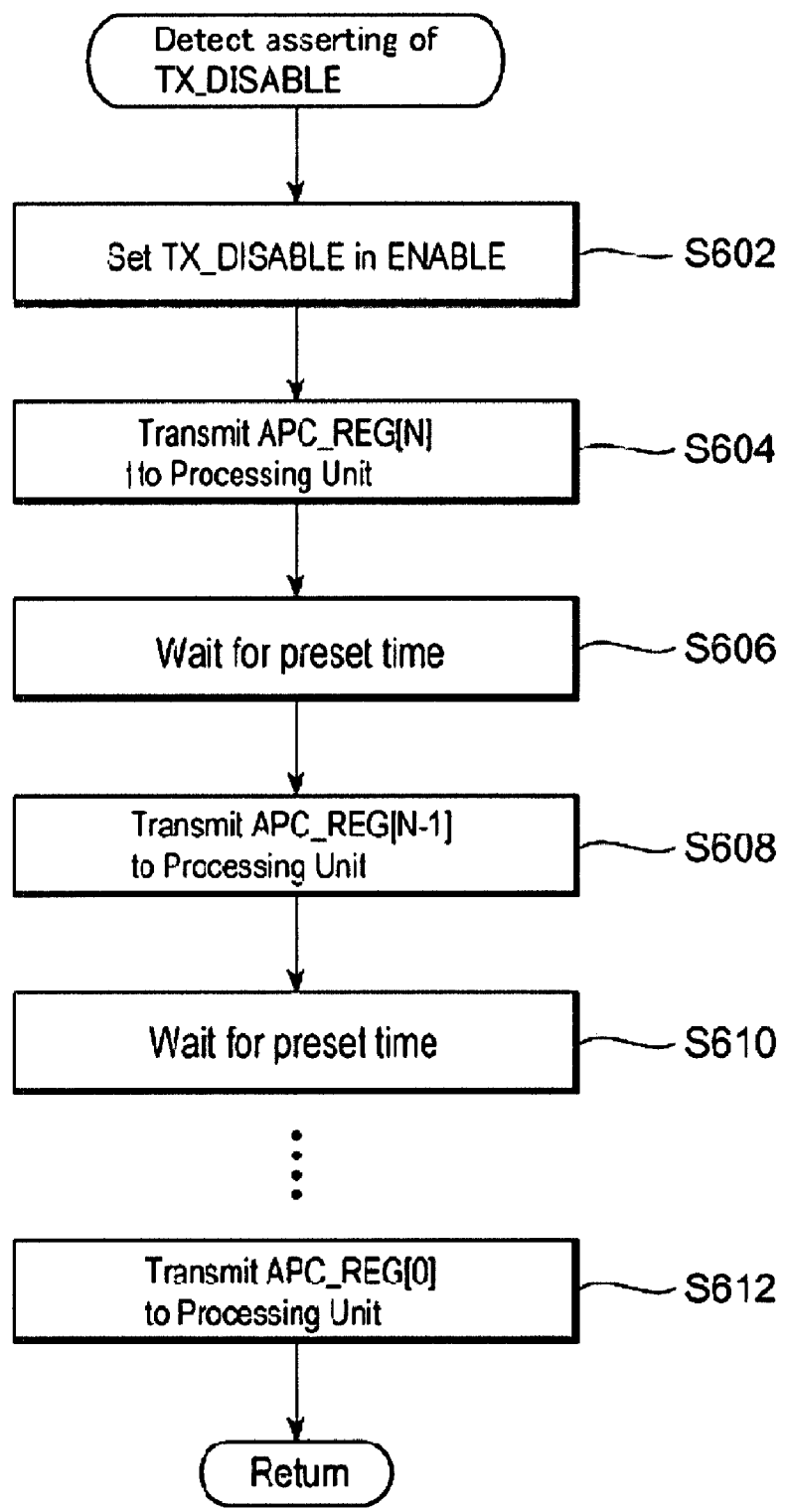
FIG. 6 is a flow chart executed at the ENABLE of the optical signal.

In the present embodiment, the optical output power of the signal 41 may change in step wise at the start of the operation. FIG. 6 is a flow chart showing a protocol when the control unit 28 resumes the operation of the transceiver, 10 or 20. This process is executed as the interruption process synchronizing with the negating of the command TX_DISABLE, namely, the falling edge thereof and the command is sent from the host controller 50 to the control unit 28.

Figure 7:
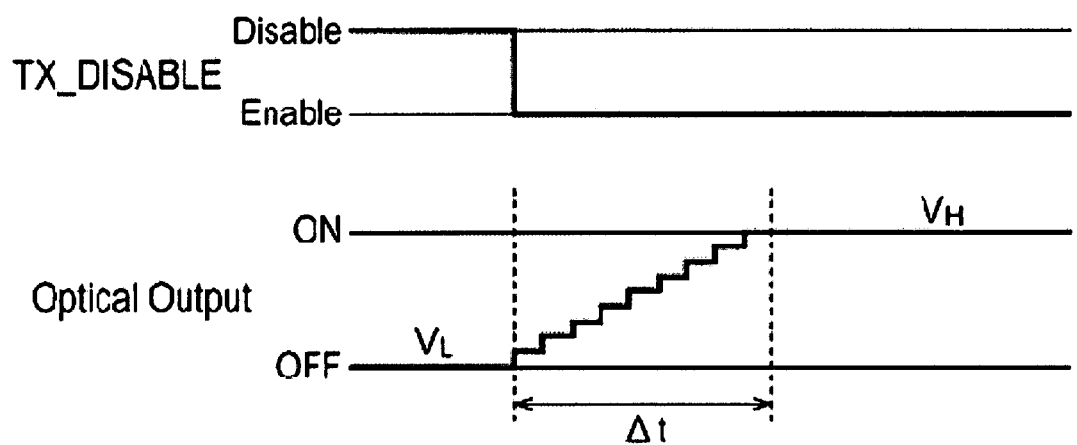
FIG. 7 is a time chart of the ENABLE operation of the optical transceiver.

FIG. 7 is a time chart showing the operation of the transceiver, 10 or 20, at the start of the operation. Synchronizing with the command TX_DISABLE from the holding mode to the operating mode, that is, triggering by the command TX_DISABLE from the HIGH level to the LOW level, the optical output power of the signal 41 gradually increases in step wise from the minimum value $V_L$, the level of the holding mode, to the target value $V_H$ in the operating mode.

As shown in FIG. 6, the control unit 28 passes the command TX_DISABLE to the processing unit 26. The command TX_DISABLE changes from the DISABLE (HIGH level) to the ENABLE (LOW level) at step S602. The processing unit 26, responding to the negating of the command TX_DISABLE, starts to supply the driving current to the LD 21.

Subsequently, the control unit 28 reads the reference, APC_REG[N], from the reference table 44 and transfers this reference to the processing unit 26 at step S604. A serial interface such as the I²C interface may perform this transfer. The control unit 28, after the transfer of the reference, holds itself by a predetermined period at step S606. During the holding of the control unit 28, the processing unit 26 overwrites the register 38 with the transferred reference, APC_REG[N]. This reference, converted to an analog form by the digital-to-analog converter 40, is sent to the APC circuit 32. Thus, the optical output power of the signal 41 may be set to the minimum value $V_L$ that corresponds to the reference APC_REG[N].

Next, the control unit 28 reads the next reference APC_REG[N-1] from the reference table 44, transfers thus read reference to the processing unit 26 at step S608, and enters the holding mode for a moment. During the holding mode of the control unit 28, the processing unit overwrites the register 38 with the reference APC_REG[N-1]. Thus, the optical output power of the signal 41 increases to a value corresponding to the reference APC_REG[N-1].

Thus, references each showing greater optical output power, are sequentially read from the reference table 44 by the predetermined period, and the register 38 is sequentially overwritten by such references. The control unit 28, after transferring the last reference ACP_REG[0] to the processing unit 26 at step S612, resumes the primary routine as enabling the interruption of the command TX_DISABLE at step S614, while, the processing unit 26 sets the optical output power of the signal 41 to be the target value $V_H$ corresponding to the reference APC_REG[0]. Thus, by sequentially setting the register 38 with the references stored in the reference table 44, the optical output power of the signal 44 may gradually increase in step wise.

Figure 8:
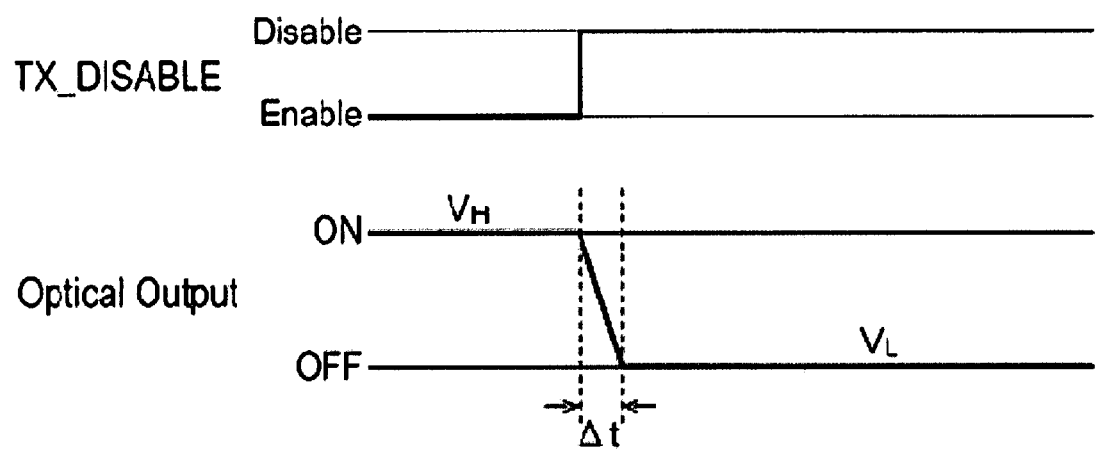
FIG. 8 is a time chart of the DISABLE operation of a conventional transceiver.
Figure 9:
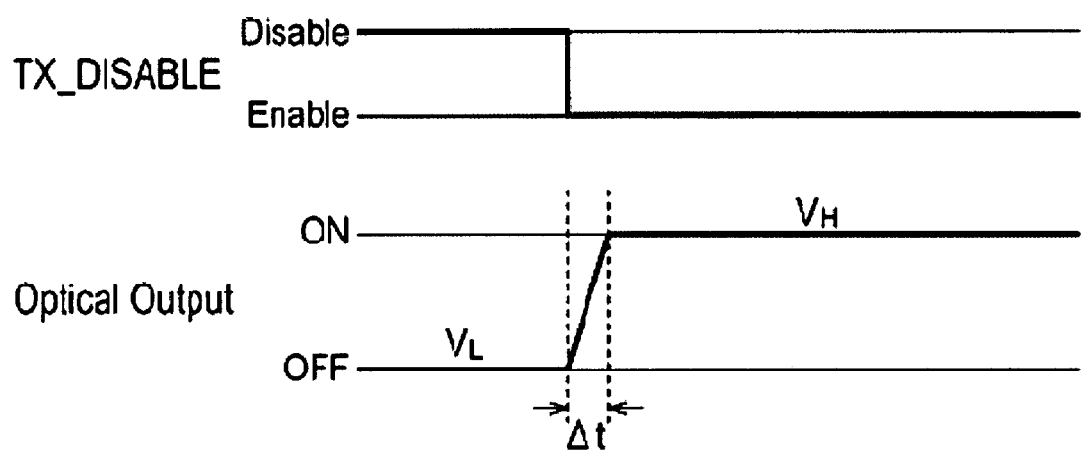
FIG. 9 is a time chart of the ENABLE operation of a conventional transceiver.

Next will compare the embodiment of the present invention with a conventional configuration. FIG. 8 is a time chart to stop the optical output power of the signal by the conventional process. Synchronizing with the assertion of the command TX_DISABLE, the optical output power of the signal 41 reduces from the value $V_H$ to the other value $V_L$ in a short period. FIG. 9 is a time chart to enable the optical output power of the signal 41. Synchronizing with the negating of the TX_DISABLE, the optical output power of the signal 41 increases from the minimum value $V_L$ to the target value $V_H$ in a short period.

When the conventional optical transmitter that functions shown in FIGS. 8 and 9, various problems such as that described below may occur. That is, when an optical output from one optical transceiver in the WDM system stops or starts, the input level of the optical amplifier provided in the system such as shown in FIG. 1 increases or decreases by an optical power corresponding to the optical signal of the channel that stops or starts its optical signal. The amplifier adjusts the gain thereof by adjusting the strength of the exciting source so as to keep the optical output power from the amplifier to be a preset level.

However, the time constant to adjust strength of the exciting source is greater than a time to stop or start the operation of the transceiver for the target channel, which is generally between 1 μsec to 10 msec. Accordingly, the gain of the optical amplifier becomes an underestimate or overestimate state until the adjustment of the exciting source becomes stable, which greatly affects the optical power of rest channels. For instance, when the gain of the amplifier becomes the overestimate state, an excess noise may occur in the optical signal or an optical input power may exceed the rated value of the optical transceiver in the receiver side. On the other hand, the underestimate gain of the amplifier may result in the increase of the error rate due to the lack of the optical power. In particular in the long-distance WDM system, the fault above mentioned may be distinguishable because the plurality of the optical amplifiers interposed in the transmission line iteratively amplifies the optical signal. Thus, the fault in single amplifier may be accumulated.

On the other hand in the embodiment of the present invention, the magnitude of the optical signal increases or decreases in step wise in a longer period than that of the conventional configuration. Accordingly, the optical amplifier 15 in the adjustment of the gain thereof may be configured to follow the change of the input optical level, and to keep the magnitude of the optical signals in respective channels. Thus, the optical transceiver, 10 or 20, of the present invention may be applicable for the WDM communication system. In particular, the optical transceiver of the present embodiment may be distinguishably applicable to the long distance WDM system.

The embodiment of the present invention may start or stop the operating mode further rapidly by providing additional function described below. That is, the optical transceivers, 10 and 20, of the present embodiment may preserve the number of signal channels L in the memory. The optical transceiver, receiving a command to stop or start the optical output, reads out the number of signal channels L from the memory and determines the number of steps to vary the optical output power from the transceiver in step wise.

In a case that the number of signal channels L is large, the stop or the start of the optical output in one channel slightly affects the other signal channels. For instance, in the case that the optical amplifier receives 64 optical signals and one signal of them is stopped, the change of the optical power input to the optical amplifier is only 0.07 dB. On the other hand, the signal channels L is small, the stop or the start of the operation of one channel, which means that the number L increases or decrease by one, may cause a greater effect to the system.

The memory within the optical transceiver may store parameters as a look-up-table how the optical amplifier decides the steps to change the optical output power depending on the signal channels. Generally, the number of steps increases as the period to vary the optical output power becomes smaller. Thus, to decide the number of steps to vary the optical output power may accelerate the DISABLE or the ENABLE of the optical output power without unnecessarily increasing the number of steps.

The present invention is thus described as referring to favorable embodiment. However, the present invention is not restricted to those shown in the embodiments, and various modifications may be considered within the scope of the listed claims. For example, although the embodiments concentrate on the optical transceiver, the optical transmitter according to the present invention is unnecessary to provide a function of the optical receiver. Moreover, the embodiment describes that the control unit 28 overwrites the register 38 with a constant period, this period is unnecessary to be constant.

What is claimed is:

1. An optical transmitter applied to a WDM system that transmits a number of optical signals each having a signal wavelength different from each other, the transmitter comprising:

a semiconductor laser diode for outputting the optical signal;

an auto-power-control circuit for adjusting a magnitude of the optical signal to a target value; and a control unit having a reference table to hold a plurality of references, the control unit being configured to receive a command to stop the output of the optical signal when the optical transmitter is in an operating mode or to start the output of the optical signal when the optical transmitter is in a hold mold, and to sequentially set, synchronizing with the reception of the command, one of references read from the table in the auto-power-control circuit as the target value, wherein the magnitude of the optical signal output from the laser diode gradually in decreases step wise when the command is to stop the output of the optical signal or gradually increases in step wise when the command is to start the output of the optical signal.

2. The optical transmitter according to claim 1,
wherein the control unit further holds the number of optical signals transmitted in the WDM system, and
wherein the control unit is further configured to determine, synchronizing with the reception of the command and depending on the number of optical signals, a number of steps to vary the magnitude of the optical signal.

3. A method for adjusting output power of an optical signal output from an optical transceiver communicating with a host controller, the optical transceiver including a semiconductor laser diode for outputting the optical signal, an auto-power-control circuit to set the power of the optical signal to a target value, and a control unit providing a reference table that stores a plurality of references, the method comprising steps of:

(a) receiving a command from the host controller, the command determining whether the optical transceiver is in an operating mode or a holding mode;

(b) reading one of references stored in the reference table by the control unit;

(c) setting the one of the references that is read from the reference table into the auto-power-control circuit as the target value;

(d) varying the output power of the optical signal output from the laser diode to the target value by the auto-power-control circuit; and (e) iterating steps from (b) to (d) until the output power of the optical signal becomes a predetermined value, wherein the output power of the optical signal is gradually varied in step wise.

4. The method according to claim 3,
wherein the optical transceiver further includes a processing unit with a register and a digital-to-analog converter, the processing unit controlling the auto-power-control circuit, and the method further including;

(b1) after the step (b), transmitting the one of references to the register in the processing unit by the control unit, and holding the control unit by a predetermined period, and (b2) during the holding of the control unit, converting the one of the references set in the register into an analog form.

5. The method according to claim 4,
wherein the predetermined period for holding the control unit is a constant period for respective steps (b).

6. The method according to claim 4,
wherein the predetermined period for holding the control unit is a variable period for respective steps (b).

* * * * *